United States Patent
Roush

(10) Patent No.: US 7,543,017 B1
(45) Date of Patent: Jun. 2, 2009

(54) CLUSTER FILE SYSTEM NODE FAILURE FILE RECOVERY BY RECONSTRUCTING FILE STATE

(75) Inventor: Ellard T. Roush, Burlingame, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1111 days.

(21) Appl. No.: 10/857,385

(22) Filed: May 28, 2004

(51) Int. Cl.
*G06F 15/16* (2006.01)
*G06F 15/173* (2006.01)

(52) U.S. Cl. .................. 709/202; 709/217; 709/223

(58) Field of Classification Search .................. None
See application file for complete search history.

(56) References Cited

U.S. PATENT DOCUMENTS

| | | | | |
|---|---|---|---|---|
| 5,608,865 | A * | 3/1997 | Midgely et al. ............... 714/1 |
| 5,812,751 | A * | 9/1998 | Ekrot et al. .................. 714/4 |
| 6,173,293 | B1 * | 1/2001 | Thekkath et al. ............. 707/201 |
| 6,411,991 | B1 * | 6/2002 | Helmer et al. ............... 709/217 |
| 6,880,101 | B2 * | 4/2005 | Golasky et al. .............. 714/4 |
| 7,159,150 | B2 * | 1/2007 | Kenchammana-Hosekote et al. ....................... 714/43 |
| 7,275,177 | B2 * | 9/2007 | Armangau et al. ............ 714/5 |
| 2004/0044707 | A1 * | 3/2004 | Richard ..................... 707/204 |
| 2005/0071390 | A1 * | 3/2005 | Midgley et al. ............. 707/204 |

\* cited by examiner

*Primary Examiner*—John B. Walsh
(74) *Attorney, Agent, or Firm*—Osha • Liang LLP

(57) ABSTRACT

A cluster file system including a file server primary configured to satisfy a plurality of file operation requests, a file server secondary configured to be promoted to the file server primary in the event of a failure of a node on which the file server primary is located, a plurality of file agents configured to process the plurality of file operation requests on the node, and a reference counting subsystem configured to track an object reference of the plurality of file agents.

23 Claims, 4 Drawing Sheets

CLUSTER FILE SYSTEM NODE FAILURE FILE RECOVERY BY RECONSTRUCTING FILE STATE

BACKGROUND

A cluster includes multiple nodes (i.e., computer systems) that interact with each other to provide users with various applications and system resources as a single entity. Clustering of computer systems is becoming an increasingly popular way for enterprises and large businesses to ensure greater availability to multiple users. Additionally, the cluster is capable of providing scalability. Thus, more services can be provided by adding more nodes to the cluster.

A cluster system is able to provide improved availability because of the ability to survive single node failures. In addition, depending upon the configuration, the cluster may be able to survive multiple node failures without the loss of services to users. In other words, the cluster may continue to provide services despite the failure of a single node within the cluster. Typically, upon failure of one or more nodes, the services provided by the node that failed are dispersed among the other running nodes to allow continued service to users.

The cluster typically includes a file system to manage data storage within the cluster. The cluster file system contains one entity representing the overall state of the cluster file system and an entity for each of the active files that exist within the cluster file system. The cluster file system allows concurrent use of files by multiple nodes. Additionally, the cluster file system uses additional components to support each active file within the cluster file system. One such component is a file proxy component (or file agent) that is located on nodes in the cluster where one or more files are being used. Conventionally, there is one file proxy for each active file associated with a node in the cluster file system. The file proxy accepts file operation requests and returns file operation results. Another component of the cluster is a file server primary. Similar to the file proxy, there is one file server primary for each active file in the cluster file system, and the file server primary communicates with the file agent for the same active file. Each file server primary provides an interface allowing access to data storage (or may directly use storage) and is capable of satisfying file operation requests.

Conventionally, in order to recover from a failed node (i.e., the node that includes the file server primaries, hereinafter referred to as the "primary node") within the cluster system, each file server primary sends information using checkpoints to at least one file server secondary, which is always located on a different node than the primary node. The checkpoints effectively replicate information on multiple nodes, thereby allowing a file server secondary to be promoted to file server primary in the event of the failure of the primary node. At a minimum, the checkpoint information requires that enough information be given to each file server secondary to allow the file server secondary (as the newly promoted file server primary) to complete file operations without errors being visible to the users of the file system.

Checkpoints are a synchronous form of communication. For example, after the checkpoint information associated with a file operation is sent, the file server primary that sent the information waits for acknowledgement from each file server secondary indicating that the information from the first file operation request was received. Additionally, the checkpoint information is recorded in the file server secondary before a file is modified with the change. This inter-machine communication during checkpointing (where the checkpoints are associated with each file operation) may end up being more costly than the file operation being checkpointed.

SUMMARY

In general, in one aspect, the invention relates to a cluster file system comprising a file server primary configured to satisfy a plurality of file operation requests, file server secondary configured to be promoted to the file server primary in the event of a failure of a node on which the file server primary is located, plurality of file agents configured to process the plurality of file operation requests on the node, and a reference counting subsystem configured to track an object reference of the plurality of file agents.

In general, in one aspect, the invention relates to a method to recover files of a cluster file system comprising identifying a node that holds an object reference to a promoted file server primary of the cluster file system, querying a file agent associated with the node to obtain file state information, and reconstructing a file state of a plurality of files using file state information.

In general, in one aspect, the invention relates to a computer system for recovering files of a cluster file system comprising a processor, a memory, a storage device, and software instructions stored in the memory for enabling the computer system under control of the processor, to identify a node that holds an object reference to a promoted file server primary of the cluster file system, query a file agent associated with the node to obtain file state information, and reconstruct a file state of a plurality of files using file state information.

Other aspects of the invention will be apparent from the following description and the appended claims.

DETAILED DESCRIPTION

Figure 1:
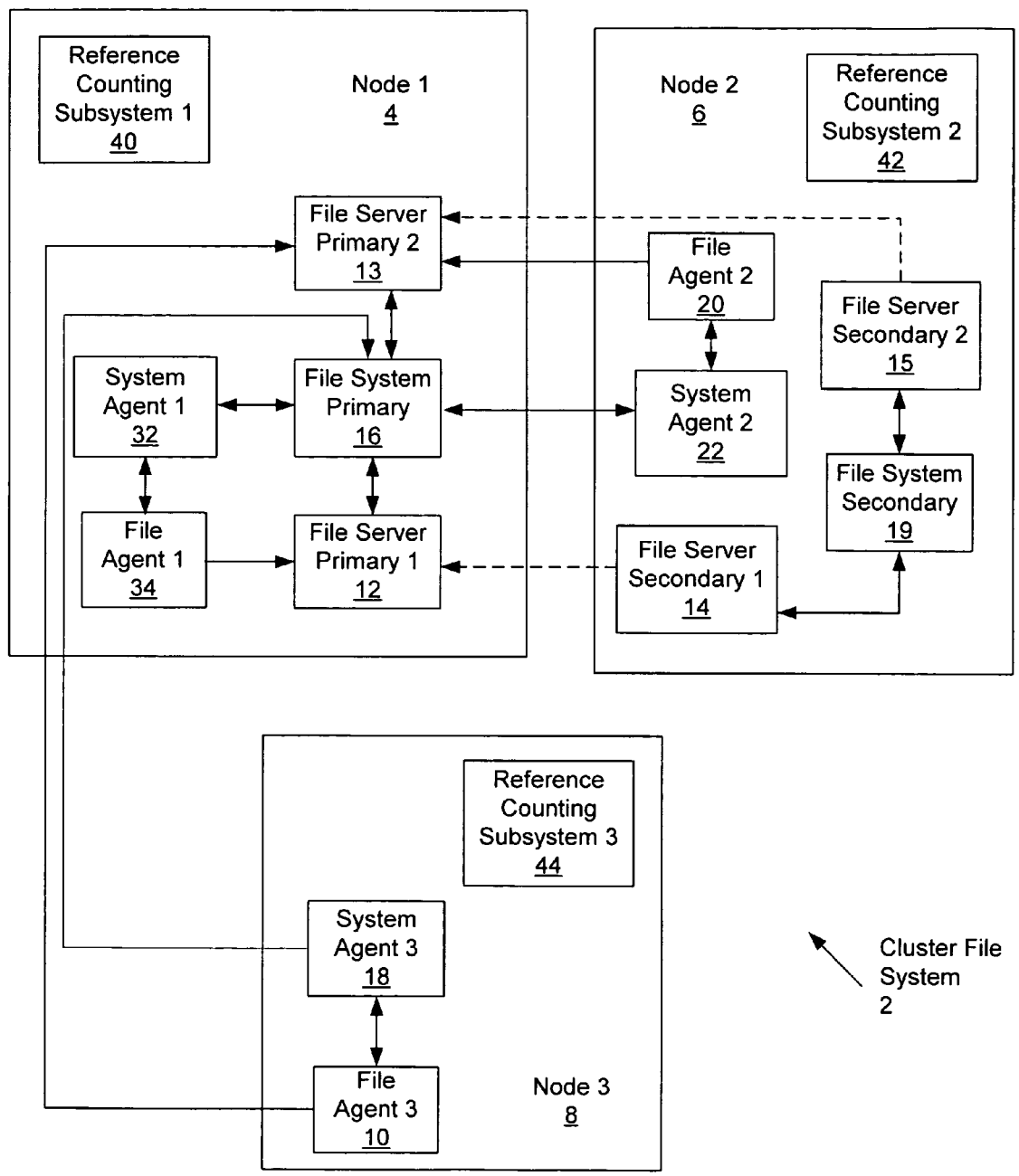
FIG. 1 shows a flow diagram of a cluster file system in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, one or more embodiments of the invention relate to a recovery process that allows a cluster file system to recover from a node failure. Specifically, embodiments of the invention relate to using file information included in file agents to compile "snapshots" of the state of one or more files before the node failure. More specifically, embodiments of the invention relate to promoting a file server secondary to a file server primary, where the newly promoted file server primary recovers the file state of one or more surviving files.

FIG. 1 shows a flow diagram of a cluster file system in accordance with one embodiment of the invention. A Cluster File System (2) is used by one or more nodes (e.g., Node 1 (4), Node 2 (6), Node 3 (8)) within the cluster to store data. Data may be stored in files by an application, process, or user. One skilled in the art will appreciate that the application, process, or user may be operating on one or more nodes. The nodes of a cluster are typically computer systems that are interconnected allowing each node to communicate with all the other nodes in the system. One skilled in the art will appreciate that the cluster may have more than one cluster file system.

In one embodiment of the invention, the Cluster File System (2) may include several components, such as one or more file server primaries (e.g., File Server Primary 1 (12), File Server Primary 2 (13)), a File Server Secondary 1 (14), a File Server Secondary 2 (15), a File System Primary (16), a File System Secondary (19), system agents (e.g., System Agent 1 (32), System Agent 2 (22), System Agent 3 (32)) associated with corresponding file agents (e.g., File Agent 1 (34), File Agent 2 (20), File Agent 3 (34)), and a reference counting subsystem (e.g., Reference Counting Subsystem 1 (40), Reference Counting Subsystem 2 (42), Reference Counting Subsystem 3 (44)), which is present on all nodes (4, 6, 8) of the Cluster File System (2).

In one embodiment of the invention, all of the aforementioned components, as well as files of the cluster file system, may be represented as objects. More specifically, each component is represented as a software unit (i.e., an object-oriented software object). In one embodiment of the invention, the objects that represent these components reside in one location. In order to access the various components within the cluster file system, an object reference is passed within the cluster file system, permitting a particular user, application or process to communicate with one or more components or access files within the cluster file system. Additionally, each object has a state. The object state allows the cluster file system to identify the object. For example, in one embodiment of the invention, an object state of "primary" indicates that object is a file server primary.

Returning to FIG. 1, in one embodiment of the invention, the file agents (34, 20, 10) e.g., a file proxy, a client, etc., may include functionality to receive incoming file operation requests (from an application, process, user, etc. For example, when a file operation request is made by a user on a particular node (4, 6, 8), the request is initially processed by the file agent (10, 20, 34) associated with that particular file. The file agent (10, 20, 34) may subsequently satisfy the file operation request and reply to the user. In addition, in one embodiment of the invention, the file agent (34, 20, 10) may store the state of the file while processing the file operation request.

For example, if a write operation request is made to a file, the file agent may store metadata regarding when the file was modified, by which node the file was modified, etc. In one embodiment of the invention, the file agent is created on a node when the node begins to access a file. Moreover, one file agent exists for each active file on a given node. Therefore, each file agent holds an object reference (e.g., to the corresponding file server primary) if the corresponding file agent is used to access files. One skilled in the art will appreciate that multiple nodes within the cluster file system may each have a file agent.

Further, the file agent (10, 20, 34) exists within a domain managed by the system agent (32, 22, 18). In one embodiment of the invention, the system agent manages the file agents on the same node. For example, in FIG. 1, Node 3 (8) includes a file agent (10). The system agent (18) associated with the file agent (10) only communicates with the file agent (10) on Node 3 (8). Similarly, the system agent (22) on Node 2 (6) only communicates with the file agent (20) on Node 2 (6).

One skilled in the art will appreciate that only one system agent exists for each node within the cluster file system. Further, a system agent always exists on each node, regardless of whether a file agent is present. This is because a file agent is created when the node is used to access a file, whereas the system agent is created when the file system is mounted. One skilled in the art will also appreciate that if a node has several file agents, then the system agent on the node manages all the file agents on the same node.

In one embodiment of the invention, the file agent may communicate directly to the corresponding file server primary. In this manner, when a file agent is unable to complete a file operation request, the file operation request is forwarded to the corresponding file server primary. Similar to file agents, there is one file server primary in the entire cluster for each active file. The file server primary executes file operations and interfaces with data storage (i.e., physical space where file data is stored) in order to execute file operation requests. One skilled in the art will appreciate that the file server primary may also directly store and retrieve data from storage (rather than interfacing to storage). In one embodiment of the invention, each file server primary exists on a single node (i.e., the primary node, e.g., Node 1 (4)) within the cluster file system and communicates with other nodes (e.g., Node 2 (6), Node 3 (8)) via the appropriate file agent. Additionally, the file server primary exists within a domain managed by a file system primary (e.g., File System Primary (16)).

Specifically, the file system primary manages the state of each file server primary (e.g., online, offline, operational, etc.). In one embodiment of the invention, file operation requests may be sent to the file system primary, which then forwards the requests to the file server primary, although in most cases, the file agent may directly communicate with the corresponding file server primary. One skilled in the art will appreciate that only one file system primary exists for the entire cluster file system, and the file system primary resides on the primary node.

Continuing with FIG. 1, in one embodiment of the invention, if the primary node fails, each of the file server secondaries (14, 15) replaces the corresponding file server primary (12, 13) that is no longer active (or online). For example, if Node 1 (4) fails, then File Server Secondary 1 (14) would replace File Server Primary 1 (12) and File Server Secondary 2 (15) would replace File Server Primary 2 (13). The file server secondary records information for a corresponding file server primary and may be located on any node except the primary node. In one embodiment of the invention, the file server secondary is capable of performing file recovery to allow the cluster file system to continue to provide services to users following one or more node failures. One skilled in the art will appreciate that each file server secondary records information for only one file server primary, and that particular file server secondary is capable of replacing only the file server primary for which the information was recorded.

The file server secondary (14, 15) exists within a domain managed by a file system secondary (19). Similar to the file system primary (16), the file system secondary (19) manages the file server secondary (14, 15) and is responsible for maintaining the state of the file server secondary. In one embodiment of the invention, the file server secondary includes the functionality to hold an object reference to the file server primary (similar to a file agent that holds an object reference to the file server primary). Consequently, a node that holds an object reference to the file server primary may not necessarily include an file agent; rather, the node may include only a file server secondary.

In one embodiment of the invention, spares (not shown) may also serve as file server secondary or file server primary components. More specifically, the cluster file system may include spares, which are capable of assuming the file server primary duties if the primary node fails. However, spares do not include an object state, and therefore must be promoted to file server secondary before being capable of assuming the functionalities of the file server primary. By being promoted to a file server secondary first, the spares acquire an object state associated with a file server secondary. In one embodiment of the invention, spares reside on different nodes than both the primary node and the node including a file server secondary.

Continuing with FIG. 1, the reference counting subsystem (i.e., Reference Counting Subsystem 1 (40), Reference Counting Subsystem 2 (42), Reference Counting Subsystem 3 (44)) is a tracking subsystem that keeps track of the object references held by each node within the Cluster File System (2). In one embodiment of the invention, the reference counting subsystem may be used when file state recovery is needed (i.e., when the primary node fails). The reference counting subsystem exists on each node (i.e., is symmetric on each node) and operates on two levels. The first level tracks the object references held on the local node. More specifically, each node includes a component of the reference counting subsystem that tracks the object reference held by that node. For example, Reference Counting Subsystem 2 (42) tracks the object references held by Node 2 (6).

On another level, the reference counting subsystem tracks which other nodes have object references to a file server primary. This component of the reference counting subsystem (i.e., the component that tracks which other nodes include object references) may reside on the primary node (e.g., Reference Counting Subsystem 1 (40)). One skilled in the art will appreciate that the components on both levels of the reference counting subsystem may also be software objects.

Figure 2:
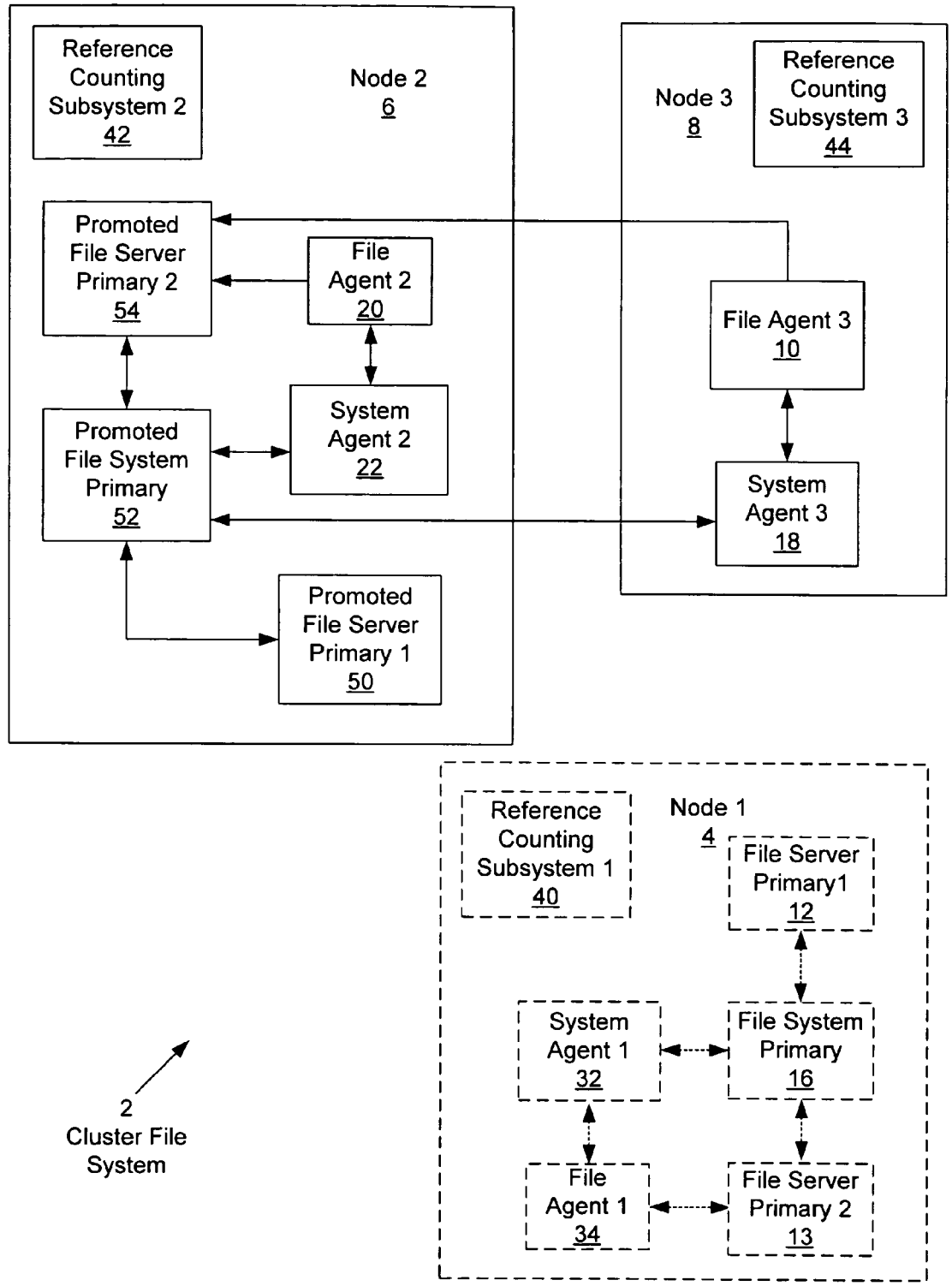
FIG. 2 shows a flow diagram of a file recovery mechanism in accordance with an embodiment of the invention.

FIG. 2 shows a flow diagram of a file recovery process in accordance with one embodiment of the invention. Node 1 (4) represents a failed node, which originally included all the primary node components, i.e., each file server primary (12, 13) and the file system primary (16). With the failure of the primary node, the Cluster File System (2) promotes a file server secondary to a file server primary (i.e., Promoted File Server Primary 1 (50), Promoted File Server Primary 2 (54)). The promoted file server primaries (50, 54) now act as a file server primary for the Cluster File System (2). Moreover, the promoted file server primary is capable of the same functionality as the original file server primary. In one embodiment of the invention, because the file server secondary is a replica of the file server primary, the file server secondary can be promoted to file server primary by changing the state of the file server secondary object (e.g., changing the object state from "secondary" to "primary").

In one embodiment of the invention, when the promoted file server primary initially replaces the file server primary, the promoted file server primary is not in the "operational state" (i.e., the promoted file server primary does not execute file operation requests). Rather, the recovery mechanism allows the promoted file server primary to transition into the complete file server primary role.

In one embodiment of the invention, the recovery mechanism involves recovering the state of files within the cluster file system. In some instances, only the file server primary may know the state of files and file operation requests that the file server primary manages. Therefore, when the primary node fails, the state of various files needs to be recovered for users to be able to continually receive services from the cluster file system. In one embodiment of the invention, the state of a file may include information such as which components of the cluster file system have read/write permissions to a file, which components have authorization to access the metadata (i.e., descriptive information and characterization) of a file, which components have modified a particular file, etc. This information may be stored in the file agent of nodes that have accessed a file, because file operation requests and replies may be processed via the file agent.

Considering all the active files in a cluster file system, typically only a small percentage of the files are actually busy (i.e., performing reads and/or writes) when a node failure occurs. In one embodiment of the invention, the cluster file system recovery mechanism operates on a demand-driven basis. In this manner, the state recovery of a file is initiated only when the file is accessed by a node (i.e., when an application, process, or user accesses the file). Thus, until a file is accessed subsequent to the failure of the primary node, the state of the file is left unrecovered. In one embodiment of the invention, if a particular file holds any locks (i.e., restricts access to itself), then the state of that file is obtained by the promoted file server primary, and recovery processing occurs immediately. In this manner, after a node failure, the promoted file server primary is able to restore all file locks prior to resuming file operations. If locks are not restored immediately, another process may obtain the lock without knowing that a previous process holds the lock, causing data to be corrupted.

Figure 3:
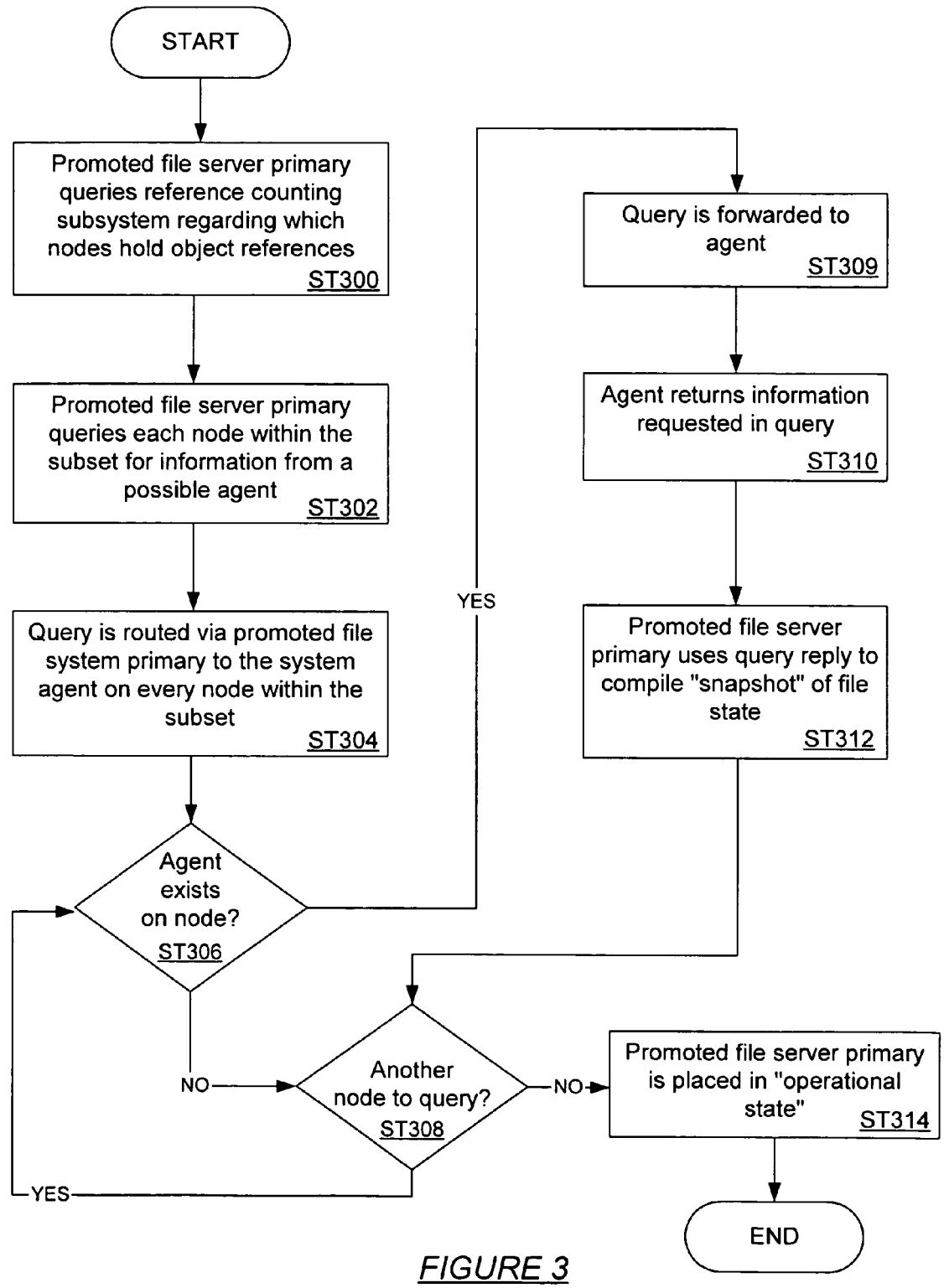
FIG. 3 shows a flow chart for a file recovery process in accordance with an embodiment of the invention.

FIG. 3 shows a flow chart for recovering the state of files in accordance with one embodiment of the invention. As noted above, the recovery process is invoked when the primary node fails and a new file server primary is promoted. Initially, the promoted file server primary queries the reference counting subsystem regarding which nodes hold object references (Step 300). More specifically, because the reference counting subsystem keeps track of the object references on the local node and which other nodes hold object references, the promoted file server primary may query the reference counting subsystem in the form of a single request. The request first allows the promoted file server primary to know whether the local node (i.e., the node on which the promoted file server primary is residing) contains any object references. Second, the request allows the promoted file server primary to know which other nodes hold object references. Therefore, now the promoted file server primary only has a subset of nodes (i.e., all the nodes that hold object references). As described above, this subset of nodes may include state information regarding specific files.

Subsequently, the promoted file server primary queries each node within the subset of nodes for file state information from a possible file agent on each node (Step 302). Specifically, the promoted file server primary queries the file agent associated with the file for which state recovery needs to be completed. The query is routed, via the file system primary, to the system agent on each of the subset of nodes (Step 304). This routing occurs because the file server primary may not be directly linked to all file agents, even though a file agent is directly linked to the file server primary (or promoted file server primary).

If a file agent exists on the node being queried (Step 306), then the query is routed to the file agent on the node (as mentioned above, a node may hold an object reference, but may not necessarily include a file agent) (Step 309). Once the query is received by the file agent, the file agent returns the information requested in the query (Step 310). Subsequently, the file server primary uses the information from the file agent to compile a "snapshot" of the file state directly before the primary node failure occurred (Step 312). The file state is subsequently stored in memory. At this stage, a determination is made to check whether additional nodes within the subset of nodes remain to be queried (Step 308). One skilled in the art will appreciate that Steps 306-312 are subsequently repeated for each node to be queried.

In contrast, if a file agent does not exist on the node being queried (Step 306), then a determination is again made to check whether another node remains to be queried (i.e., from the subset of nodes) for information from a possible file agent (Step 308). If no additional nodes remain to be queried, the process ends. Alternatively, if other nodes remain to be queried, Steps 306-312 are subsequently repeated for each node to be queried. Again, all the snapshots compiled by the promoted file server primary are stored in memory.

One skilled in the art will appreciate that the recovery process occurs for every promoted file server primary to recover the state of multiple files. However, this process may not occur simultaneously because each file is recovered only when the file is accessed subsequent to the failure of the primary node.

Upon completion of gathering data from each valid file agent, the promoted file server primary is placed in the "operational state" (Step 314). As noted above, initially, when a node failure occurs, the file server secondary is promoted to a file server primary. During this transitional stage, the promoted file server primary is not yet fully operational (i.e., the file server primary does not take incoming file operation requests). As described above, the components of the cluster file system are all objects. In one embodiment of the invention, the object state of the promoted file server primary is recorded within the promoted file server primary object. When the promoted file server primary is placed in the "operational state," the state is recorded as a file server primary object rather than a file server secondary object.

In one embodiment of the invention, the aforementioned recovery mechanism may not apply to every file system operation. Rather, the recovery mechanism may be used for file operations in which the state of the file is already replicated within file agents. In other words, the recovery mechanism may not apply to file operations in which no state information is contained within at least one file agent within the cluster file system.

Figure 4:
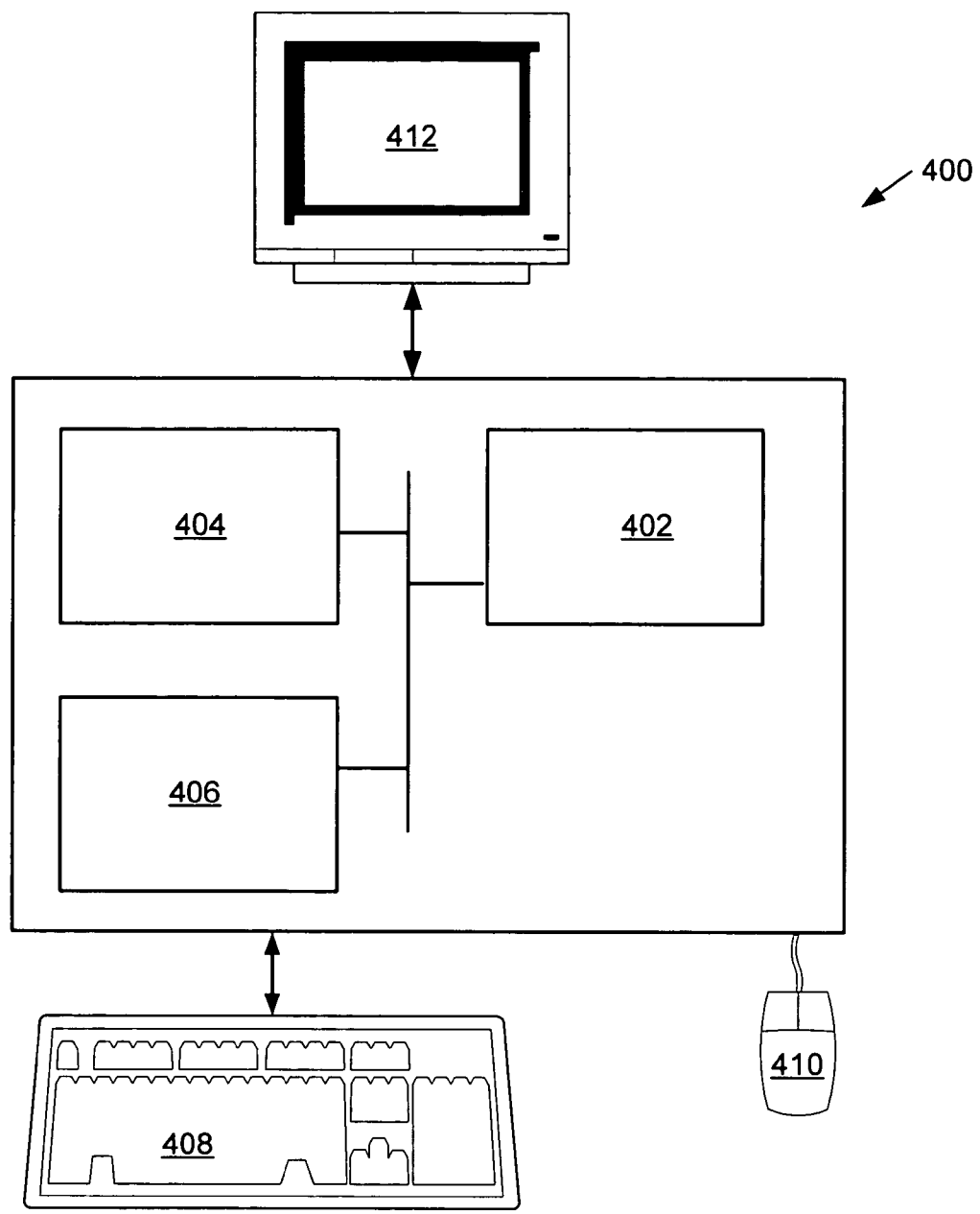
FIG. 4 shows a computer system in accordance with an embodiment of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The networked computer (400) may also include input means, such as a keyboard (408) and a mouse (410), and output means, such as a monitor (412). In one embodiment of the invention, the computer system (400) may be connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (400) may be located at a remote location and connected to the other elements over a network.

Embodiments of the invention include the ability to perform file state recovery so that users of a cluster file system continue to receive services from the cluster, despite the failure of a node that contains all the file server primaries. Additionally, embodiments of the invention use a demand-driven file state recovery mechanism that allows files to be efficiently recovered based on the file usage. Moreover, embodiments of the invention use information already included in file agents to recover file states, preventing the need to copy information from one component to another. Further, embodiments of the invention may include the ability for the recovery mechanism to be scalable for a multi-node cluster by allowing a method to query only a subset of nodes for file state information. Because most files in a cluster file system are not shared (i.e., shared between nodes), the recovery mechanism may perform only a single query to recover the state of a particular file.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A cluster file system comprising:
   a file server primary configured to satisfy a plurality of file operation requests;
   a file server secondary configured to be promoted to the file server primary in the event of a failure of a node on which the file server primary is located;
   a plurality of file agents configured to process the plurality of file operation requests on the node;
   a reference counting subsystem configured to track an object reference of the plurality of file agents;
   a file system primary configured to communicate with the file server primary; and
   a plurality of system agents configured to communicate with the plurality of file agents, wherein the file system primary tracks the plurality of system agents.

2. The cluster file system of claim 1, wherein the file server primary interfaces with storage to satisfy the plurality of file operation requests.

3. The cluster file system of claim 1, wherein the plurality of file agents forward requests to the file server primary.

4. The cluster file system of claim 1, wherein the plurality of file agents forward requests to a corresponding system agent of the plurality of system agents.

5. The cluster file system of claim 1, wherein the file system primary receives requests from the plurality of system agents.

6. The cluster file system of claim 1, further comprising:
   a spare configured to assume the duties of the file server primary when the file server primary fails, wherein the spare is promoted to file server secondary prior to being promoted to file server primary.

7. The cluster file system of claim 1, further comprising:
   a plurality of files, wherein the plurality of files are accessed by the node using the plurality of file agents holding an object reference to the file server primary.

8. The cluster file system of claim 1, wherein the file server primary and the file server secondary are located on different nodes in the cluster file system.

9. A method to recover files of a cluster file system comprising:
   identifying a node that holds an object reference to a promoted file server primary of the cluster file system;
   querying a file agent associated with the node to obtain file state information;
   forwarding the query from the promoted file server primary to a system agent on the node, wherein the system agent is configured to communicate with the file agent, and wherein the system agent is tracked by a file system primary configured to communicate with and manage the state of the promoted file server primary; and reconstructing a file state of a plurality of files using file state information.

10. The method of claim 9, further comprising:

placing the promoted file server primary in an operational state.

11. The method of claim 10, wherein placing the promoted file server primary in an operational state comprises:

modifying an object state of the promoted file server primary, wherein the object state is primary;

allowing the promoted file server primary to process a file operation request.

12. The method of claim 9, wherein the promoted file server primary is a file server secondary that is promoted to a file server primary when the node containing the file server primary fails.

13. The method of claim 9, wherein determining a node holding the object reference comprises:

querying a reference counting subsystem, wherein the reference counting subsystem tracks the object reference.

14. The method of claim 9, wherein querying the file agent comprises:

determining whether the file agent exists on the node.

15. The method of claim 9, wherein reconstructing the file state of a plurality of files comprises:

gathering state information from the file agent that holds the object reference to the promoted file server primary.

16. The method of claim 9, wherein reconstructing the file state of the plurality of files occurs on an on-demand basis.

17. The method of claim 9, wherein reconstructing the file state of the file comprises:

reconstructing an active file state upon failure of the file server primary, if file includes a lock.

18. A computer system for recovering files of a cluster file system comprising:

a processor;
a memory;
a storage device; and
software instructions stored in the memory for enabling the computer system under control of the processor, to:

identify a node that holds an object reference to a promoted file server primary of the cluster file system;

query a file agent associated with the node to obtain file state information;

forward the query from the promoted file server primary to a system agent on the node, wherein the system agent is configured to communicate with the file agent, and wherein the system agent is tracked by a file system primary configured to communicate with and manage the state of the promoted file server primary; and reconstruct a file state of a plurality of files using file state information.

19. The computer system of claim 18, wherein the software instructions to reconstruct the file state of a plurality of files comprises reconstructing the file state on an on-demand basis.

20. The computer system of claim 18, wherein the software instructions to reconstruct the file state of a file comprises reconstructing the active file state upon failure of the file server primary if the file includes a lock.

21. The computer system of claim 18, further comprising software instructions to:

place the promoted file server primary in an operational state.

22. The computer system of claim 21, wherein the software instructions to place the promoted file server primary in an operational state comprises:

modifying an object state of the promoted file server primary, wherein the object state is primary;

allowing the promoted file server primary to process a file operation request.

23. The computer system of claim 18, wherein the promoted file server primary is a file server secondary that is promoted to a file server primary when the node containing the file server primary fails.

* * * * *